(12) United States Patent
Ito et al.

(10) Patent No.: US 11,118,461 B2
(45) Date of Patent: Sep. 14, 2021

(54) TURBINE ROTOR BLADE AND GAS TURBINE

(71) Applicant: MITSUBISHI HEAVY INDUSTRIES, LTD., Tokyo (JP)

(72) Inventors: Ryuta Ito, Tokyo (JP); Koichiro Iida, Tokyo (JP)

(73) Assignee: MITSUBISHI POWER, LTD., Kanagawa (JP)

( * ) Notice: Subject to any disclaimer, the term of this patent is extended or adjusted under 35 U.S.C. 154(b) by 0 days.

(21) Appl. No.: 16/978,998

(22) PCT Filed: Mar. 27, 2019

(86) PCT No.: PCT/JP2019/013176
§ 371 (c)(1),
(2) Date: Sep. 8, 2020

(87) PCT Pub. No.: WO2019/189355
PCT Pub. Date: Oct. 3, 2019

(65) Prior Publication Data
US 2021/0003018 A1    Jan. 7, 2021

(30) Foreign Application Priority Data
Mar. 29, 2018 (JP) .............................. JP2018-064578

(51) Int. Cl.
*F01D 5/18* (2006.01)
*F01D 5/08* (2006.01)
(Continued)

(52) U.S. Cl.
CPC ............... *F01D 5/18* (2013.01); *F01D 5/08* (2013.01); *F01D 5/20* (2013.01); *F01D 5/28* (2013.01);
(Continued)

(58) Field of Classification Search
CPC ... F01D 5/18; F01D 5/187; F01D 5/20; F05D 2240/307
See application file for complete search history.

(56) References Cited

U.S. PATENT DOCUMENTS 5,261,789 A    11/1993  Butts et al.
5,476,364 A *  12/1995  Kildea .................. F01D 5/20
                                                    416/95
(Continued)

FOREIGN PATENT DOCUMENTS

JP    3080817    8/2000
JP    3137527    2/2001
(Continued)

OTHER PUBLICATIONS

Young Cheol Nho et al., "Effects of Tip Shape on the Gas Turbine Blade Tip Heat Transfer", Journal of Thermophysics and Heat Transfer, vol. 26, No. 2, Apr.-Jun. 2012, pp. 305-312.
(Continued)

*Primary Examiner* — Eldon T Brockman
(74) *Attorney, Agent, or Firm* — Wenderoth, Lind & Ponack, L.L.P.

(57) ABSTRACT

A second outer surface (49*ab*) of a top plate (49) is recessed from a first outer surface (49*aa*) of the top plate (49) in the direction away from the inner peripheral surface (34*a*) of a turbine casing (34) so that a step (50) is formed between the second outer surface (49*ab*) and the first outer surface (49*aa*). At least part of the discharge opening (53B) of a cooling hole (53) is disposed in the second outer surface (49*ab*). The cooling hole (53) extends so as to be tilted relative to the second outer surface (49*ab*) so that the cooling hole (53) discharges a cooling medium to the upstream side
(Continued)

of a combustion gas flowing between the second outer surface (49*ab*) and the inner peripheral surface (34*a*) of the turbine casing (34).

10 Claims, 8 Drawing Sheets

(51) Int. Cl.
  *F01D 5/20* (2006.01)
  *F01D 5/28* (2006.01)
  *F02C 7/28* (2006.01)
(52) U.S. Cl.
  CPC ............ *F02C 7/28* (2013.01); *F05D 2220/32* (2013.01); *F05D 2240/24* (2013.01); *F05D 2240/30* (2013.01); *F05D 2240/307* (2013.01)

(56) References Cited

U.S. PATENT DOCUMENTS

| | | | | |
|---|---|---|---|---|
| 5,564,902 | A * | 10/1996 | Tomita | F01D 5/20 415/115 |
| 5,660,523 | A * | 8/1997 | Lee | F01D 5/20 416/97 R |
| 7,553,534 | B2 * | 6/2009 | Bunker | F01D 5/186 415/115 |
| 8,414,262 | B2 * | 4/2013 | Hada | F01D 5/20 416/92 |
| 8,684,691 | B2 * | 4/2014 | Lee | F01D 5/20 416/92 |
| 2009/0246011 | A1 * | 10/2009 | Itzel | F01D 5/186 415/208.1 |
| 2010/0111704 | A1 * | 5/2010 | Hada | F01D 5/20 416/97 R |
| 2021/0003018 | A1 * | 1/2021 | Ito | F01D 5/18 |

FOREIGN PATENT DOCUMENTS

| | | |
|---|---|---|
| JP | 2009-236112 | 10/2009 |
| JP | 5031103 | 9/2012 |

OTHER PUBLICATIONS

International Search Report dated Jun. 25, 2019 in International (PCT) Application No. PCT/JP2019/013176, with English translation.
Written Opinion of the International Searching Authority dated Jun. 25, 2019 in International (PCT) Application No. PCT/JP2019/013176, with English translation.

\* cited by examiner

TURBINE ROTOR BLADE AND GAS TURBINE

TECHNICAL FIELD

The present invention relates to a turbine rotor blade and a gas turbine.

Priority is claimed on Japanese Patent Application No. 2018-064578 filed on Mar. 29, 2018, the content of which is incorporated herein by reference.

BACKGROUND ART

A gas turbine includes a compressor, a combustor, and a turbine. The turbine includes a plurality of stator blades and rotor blades (turbine rotor blades).

In the gas turbine, the temperature of combustion gas acting on the plurality of stator blades and rotor blades reaches a high temperature of 1500° C. Therefore, the stator blades and the rotor blades include cooling channels and cooling holes through which a cooling medium flows. Regarding each of the stator blades and the rotor blades, a blade wall is cooled by means of the cooling medium and the cooling medium discharged from a cooling hole provided in the blade wall is caused to flow out toward a combustion gas side such that a blade surface is cooled.

A constant gap is formed between tip end portions of the rotor blades and a ring segment (part of casing) constituting a casing such that the tip end portions and the ring segment do not interfere with each other. In a case where the gap is excessively large, a portion of combustion gas is carried away to a downstream side over blade tip end portions and tip leakage becomes large. In a case where the tip leakage is large, energy loss becomes large and thus there is a decrease in heat efficiency of the gas turbine.

In addition, in a case where the above-described gap is excessively small, there is a possibility that blade bodies of the rotor blades come into contact with the ring segment and the blade bodies are damaged.

For this reason, in the related art, a tip thinning (may also be referred to as "tip squealer") is provided at a tip end portion of a blade body in order to suppress an outflow of combustion gas from a gap as described above and damage to the blade body. Meanwhile, a thermal load on the tip thinning is large since the tip thinning is heated in three directions, the three directions being directions toward opposite side surfaces of the tip thinning and a top surface of the tip thinning. Therefore, the tip thinning is cooled so that the tip thinning is protected from heat (for example, refer to PTL 1).

PTL 1 discloses a rotor blade including a tip thinning formed on a top plate belly side and cooling holes that penetrate a lower end of the tip thinning and a top plate and are inclined in a state where a cooling medium can be discharged to a belly side (pressure surface side).

CITATION LIST

Patent Literature

[PTL 1] U.S. Pat. No. 5,261,789

SUMMARY OF INVENTION

Technical Problem

However, in PTL 1, the cooling medium is discharged from a portion of the tip thinning since the cooling holes are formed to penetrate the lower end of the tip thinning and the top plate.

Accordingly, the discharged cooling medium is likely to flow to a casing side along a wall surface of the tip thinning and thus there is a possibility that the cooling medium flows in a direction away from an outer surface of the top plate.

Therefore, it is difficult to cool the top plate positioned closer to a back side than the tip thinning by means of a film cooling effect using the cooling medium discharged from the cooling holes.

In other words, there is a problem that it is not possible to reduce the amount of use of a cooling medium necessary to cool a blade body since a cooling medium for cooling the top plate positioned closer to the back side than the tip thinning is separately required.

Therefore, an object of the present invention is to provide a turbine rotor blade and a gas turbine with which it is possible to reduce the amount of cooling medium used to cool a blade body.

Solution to Problem

In order to solve the above-described problems, an aspect of the present invention provides a turbine rotor blade including a blade body that includes a pressure surface side blade wall and a suction surface side blade wall that extend in a radial direction of a turbine rotor and are connected to each other at a leading edge and a trailing edge and a top plate that is provided at a tip end portion out of end portions of the pressure surface side blade wall and the suction surface side blade wall and includes an outer surface facing an inner peripheral surface of a casing, the tip end portion being disposed on an outer side in the radial direction of the turbine rotor, and a cooling hole that penetrates the top plate and includes a discharge port through which a cooling medium is discharged to an outside of the top plate. The outer surface of the top plate includes a first outer surface that is provided at a suction surface side region and a central region and a second outer surface that is provided at a pressure surface side region and constitutes the rest of the outer surface excluding the first outer surface, the suction surface side region being disposed on the suction surface side blade wall side and extending from the leading edge to the trailing edge, the central region being disposed between the pressure surface side region disposed on the pressure surface side blade wall side and extending from the leading edge to the trailing edge and the suction surface side region and extending from the leading edge to the trailing edge, and the pressure surface side region being disposed on the pressure surface side blade wall side and extending from the leading edge to the trailing edge. The second outer surface is more distant from the inner peripheral surface of the casing than the first outer surface such that a step is formed between the second outer surface and the first outer surface. A portion where the step is formed is provided with a side surface that connects the first outer surface and the second outer surface to each other and extends along a pressure surface of the pressure surface side blade wall. The cooling hole extends while being inclined with respect to the second outer surface such that the cooling medium is discharged to an upstream side of combustion gas flowing between the second outer surface and the inner peripheral surface of the casing. At least a portion of the discharge port is disposed in the second outer surface.

According to the present invention, the discharge port is disposed in the second outer surface of the top plate that is positioned closer to the pressure surface side blade wall side than the step and the cooling hole through which the cooling medium is discharged to the upstream side of combustion gas flowing between the second outer surface and the inner peripheral surface of the casing is provided and thus the cooling medium discharged to the upstream side of the combustion gas separated from the step can be caused to flow along the first outer surface of the top plate.

Accordingly, it is possible to efficiently perform film cooling on the first outer surface of the top plate positioned closer to the suction surface side blade wall side than the step by causing the cooling medium discharged from the discharge port to collide with a corner portion of the step disposed on the casing side. Therefore, it is possible to reduce the amount of cooling medium used to cool the blade body of the turbine rotor blade.

In addition, since the cooling hole that extends while being inclined with respect to the second outer surface and through which the cooling medium is discharged to the upstream side of combustion gas flowing between the second outer surface and the inner peripheral surface of the casing is provided, a distance between a portion of the top plate that constitutes the first outer surface and the cooling hole can be made short in the radial direction of the turbine rotor. Accordingly, it is possible to efficiently cool the portion of the top plate that constitutes the first outer surface through convection cooling.

In addition, in the turbine rotor blade according to the aspect of the present invention, the cooling hole may include a portion of which a section obtained when the portion is cut in a plane orthogonal to an axial direction of the cooling hole is circular and a height of the step in the radial direction of the turbine rotor may fall into a range of 0.25 D to 2.00 D, where D is a diameter of the cooling hole at the section.

For example, in a case where the height of the step is smaller than 0.25 D, since the step is too small, there is a possibility that it becomes difficult to cause the cooling medium discharged from the cooling hole to collide with the corner portion of the step disposed on the turbine casing 34 side. Accordingly, there is a possibility that it becomes difficult to cause the cooling medium to flow along the first outer surface.

Meanwhile, in a case where the height of the step is greater than 2.00 D, since the step is too large, there is a possibility that the step becomes an obstacle (side surface becomes obstacle) and it becomes difficult to cause the cooling medium discharged from the cooling hole to flow along the first outer surface.

Therefore, in a case where the height of the step is set in a range of 0.25 D to 2.00 D, the cooling medium discharged from the cooling hole flows along the first outer surface and thus it is possible to reduce the amount of cooling medium used to cool the blade body of the turbine rotor blade.

In addition, in the turbine rotor blade according to the aspect of the present invention, the cooling hole may include a portion of which a section obtained when the portion is cut in a plane orthogonal to an axial direction of the cooling hole is circular and a distance from a connection position between the side surface and the second outer surface to an axis of the cooling hole in a direction orthogonal to the side surface may be equal to or greater than 0 and equal to or smaller than D, where D is a diameter of the cooling hole at the section.

For example, in a case where the distance from the connection position between the side surface and the second outer surface to the axis of the cooling hole in the direction orthogonal to the side surface connecting the first outer surface and the second outer surface to each other is smaller than 0, a major portion of the discharge port is formed in the side surface and thus there is a possibility that the height of the step with respect to the cooling hole becomes small.

Therefore, there is a possibility that it becomes difficult to cause the cooling medium discharged from the cooling hole to collide with the corner portion of the step. Accordingly, there is a possibility that it becomes difficult to cause the cooling medium to flow along the first outer surface.

Meanwhile, in a case where the distance from the connection position between the side surface and the second outer surface to the axis of the cooling hole in the direction orthogonal to the side surface connecting the first outer surface and the second outer surface to each other is greater than D, the cooling medium is discharged to a position excessively separated from the step and thus there is a possibility that it becomes difficult to cause the cooling medium to collide with the corner portion of the step. Accordingly, there is a possibility that it becomes difficult to cause the cooling medium to flow along the first outer surface.

Therefore, in a case where the distance from the connection position between the side surface and the second outer surface to the axis of the cooling hole in the direction orthogonal to the side surface connecting the first outer surface and the second outer surface to each other is set to be equal to or greater than 0 and equal to or smaller than D, the cooling medium discharged from the cooling hole flows along the first outer surface and thus it is possible to reduce the amount of cooling medium used to cool the blade body of the turbine rotor blade.

In addition, in the turbine rotor blade according to the aspect of the present invention, an angle formed by an axis of the cooling hole and the second outer surface may be equal to or greater than 30° and equal to or smaller than 45°.

For example, in a case where the angle formed by the axis of the cooling hole and the second outer surface is smaller than 30°, there is a possibility that it becomes difficult to process the cooling hole.

Meanwhile, in a case where the angle formed by the axis of the cooling hole and the second outer surface is greater than 45°, the cooling medium discharged from the cooling hole flows at a position separated from the first outer surface and thus there is a possibility that it becomes difficult to achieve high film cooling effectiveness.

Therefore, in a case where the angle formed by the axis of the cooling hole and the second outer surface is set to be equal to or greater than 30° and equal to or smaller than 45°, it becomes easy to process the cooling hole and it becomes possible to perform film cooling on the first outer surface of the top plate.

In addition, the turbine rotor blade according to the aspect of the present invention may further include a first inclined surface that is provided between the second outer surface and the pressure surface of the pressure surface side blade wall, connects the second outer surface and the pressure surface to each other, and is inclined with respect to the second outer surface and the pressure surface, and a second inclined surface that is provided between the first outer surface and a suction surface of the suction surface side blade wall, connects the first outer surface and the suction surface to each other, and is inclined with respect to the first outer surface and the suction surface.

As described above, in a case where the first inclined surface that connects the second outer surface and the pressure surface to each other and is inclined with respect to the second outer surface and the pressure surface is provided, it is possible to suppress an increase in temperature of a portion of the blade body that constitutes the first inclined surface to a high temperature.

In addition, in a case where the second inclined surface that connects the first outer surface and the suction surface to each other and is inclined with respect to the first outer surface and the suction surface is provided, it is possible to suppress an increase in temperature of a portion of the blade body that constitutes the second inclined surface to a high temperature.

In addition, in the turbine rotor blade according to the aspect of the present invention, the blade body may include a metal substrate that corresponds to a shape of the blade body and a thermal insulation coating layer that covers an outer surface of the metal substrate, and the first outer surface, the second outer surface, and the side surface may be formed by the outer surface of the thermal insulation coating layer.

In a case where the thermal insulation coating layer covering the outer surface of the metal substrate that corresponds to the shape of the blade body is provided as described above, it is possible to protect the metal substrate from high-temperature combustion gas.

In addition, in the turbine rotor blade according to the aspect of the present invention, the blade body may include a metal substrate that corresponds to a shape of the blade body and a thermal insulation coating layer that covers an outer surface of the metal substrate except for the second outer surface, and the first outer surface and the side surface may be formed by an outer surface of the thermal insulation coating layer, and the second outer surface may be formed by the outer surface of the metal substrate.

In a case where the first outer surface and the side surface are formed by the outer surface of the thermal insulation coating layer and the second outer surface is formed by the outer surface of the metal substrate as described above, it is possible to form the step by using the thickness of the thermal insulation coating layer without forming a step at the metal substrate.

Accordingly, since it becomes not necessary to form a step at the metal substrate, it is possible to easily manufacture the metal substrate and thus it is possible to reduce the cost of manufacturing the blade body.

In addition, in the turbine rotor blade according to the aspect of the present invention, a plurality of the cooling holes may be formed at intervals from the leading edge to the trailing edge along the pressure surface of the pressure surface side blade wall.

In a case where the plurality of the cooling holes are formed at intervals from the leading edge to the trailing edge along the pressure surface of the pressure surface side blade wall as described above, high film cooling effectiveness can be achieved.

In addition, in the turbine rotor blade according to the aspect of the present invention, a cooling channel through which the cooling medium flows may be formed inside the blade body, the plurality of cooling holes may include a plurality of first cooling holes that are formed in a leading edge side region positioned on the leading edge side and a trailing edge side region positioned on the trailing edge side and a plurality of second cooling holes that are formed in an intermediate region disposed between the leading edge side region and the trailing edge side region, a section of the first cooling hole which is cut in a plane orthogonal to an axial direction of the first cooling hole may be circular, the second cooling hole includes a first portion that is formed on the cooling channel side and a second portion that is formed outside the first portion in a state of being connected to the first portion and includes the discharge port, a section of the first portion which is cut in a plane orthogonal to an axial direction of the second cooling hole may be circular and a diameter of the first portion in the axial direction of the second cooling hole may be constant, and a width of the second portion in a direction along the pressure surface of the pressure surface side blade wall may increase toward the discharge port from the first portion.

In a case where a section of each of the plurality of second cooling holes formed in the intermediate region that is obtained when the second cooling hole is cut in a plane orthogonal to the axial direction of the second cooling hole is circular and each second cooling hole includes the first portion of which the diameter in the axial direction of the second cooling hole is constant and the second portion of which the width in the direction along the pressure surface of the pressure surface side blade wall increases toward a discharge surface from the first portion as described above, the cooling medium can be discharged to a wide range from the discharge port since the width of the discharge port of each of the plurality of second cooling holes in the direction along the pressure surface of the pressure surface side blade wall is large.

Accordingly, the arrangement pitch of the second cooling holes can be made larger than the arrangement pitch of the first cooling holes so that the number of second cooling holes to be disposed in the intermediate region is reduced.

In addition, another aspect of the present invention provides a gas turbine including a turbine that includes a turbine rotor in which a plurality of the turbine rotor blades are disposed in a circumferential direction and an axial direction and the plurality of turbine rotor blades, a compressor that generates compressed air by sucking in air for combustion, a combustor that injects fuel into the compressed air to cause combustion and to generate combustion gas with which the turbine is driven, and a casing that includes a ring segment and accommodates the turbine rotor and the plurality of turbine rotor blades, the ring segment facing the first and second outer surfaces of the top plate in a state where a gap is interposed therebetween.

With the gas turbine configured as described above, it is possible to reduce the amount of cooling medium used to cool the plurality of turbine rotor blades.

Advantageous Effects of Invention

According to the present invention, it is possible to reduce the amount of cooling medium used to cool a blade body of a turbine rotor blade.

DESCRIPTION OF EMBODIMENTS

Hereinafter, embodiments of the present invention will be described in detail with reference to the drawings.

First Embodiment

Figure 1:
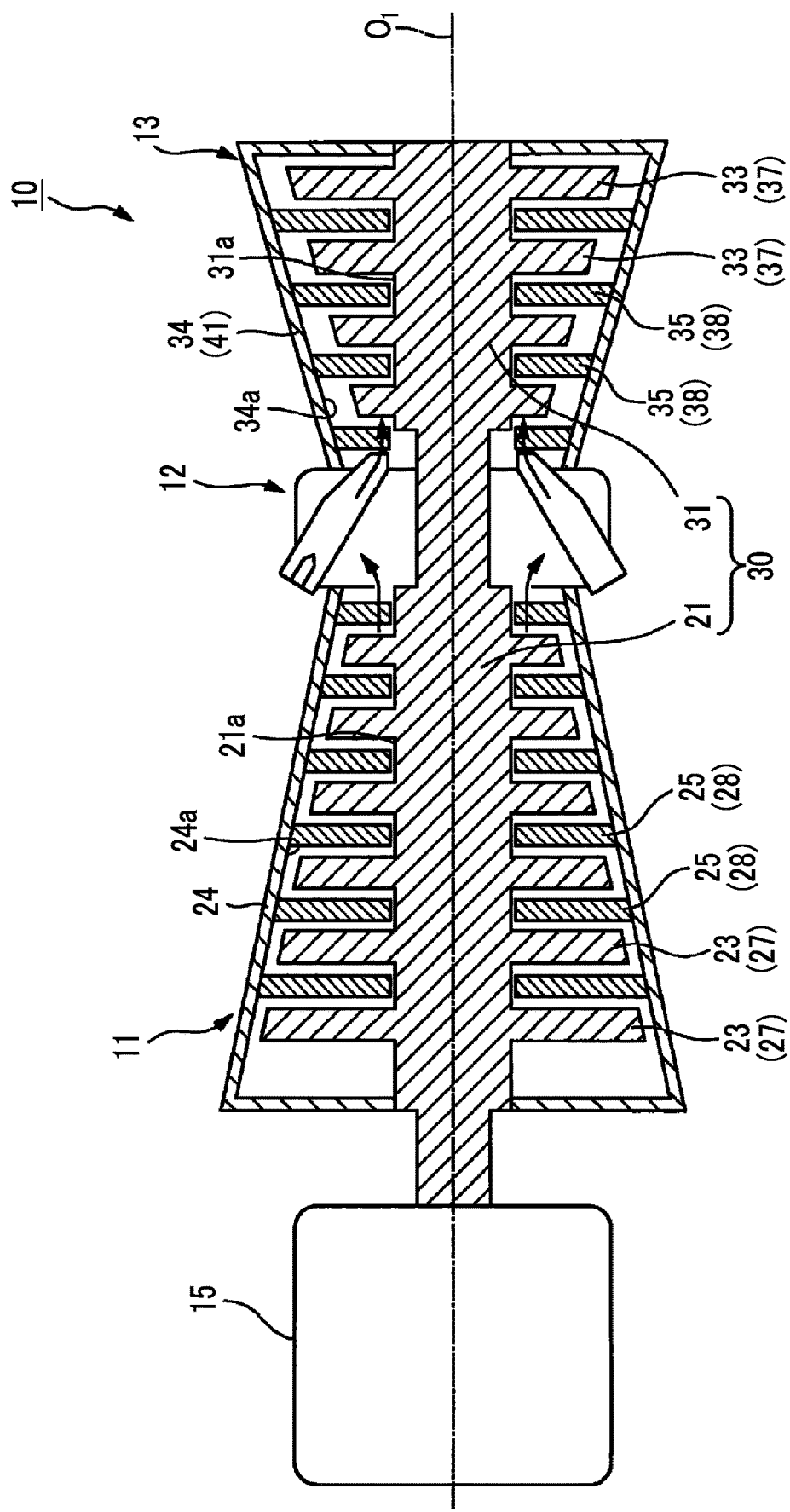
FIG. 1 is a sectional view schematically showing a schematic configuration of a gas turbine according to a first embodiment of the present invention.

A gas turbine 10 according to a first embodiment of the present invention will be described with reference to FIG. 1. FIG. 1 also shows, for convenience of description, a generator 15, which is not a component of the gas turbine 10. In FIG. 1, $O_1$ denotes the axis (hereinafter, will be referred to as "axis $O_1$") of a rotor 30. The axis $O_1$ of the rotor 30 also serves as the axis of a turbine rotor 31. In addition, arrows in a compressor 11 shown in FIG. 1 denote directions in which compressed air flows.

The gas turbine 10 includes the compressor 11, a combustor 12, and a turbine 13.

The compressor 11 includes a compressor rotor 21, a plurality of compressor rotor blade stages 23, a compressor casing 24, and a plurality of compressor stator blade stages 25.

The compressor rotor 21 is a rotating body having a cylindrical shape. The compressor rotor 21 includes an outer peripheral surface 21a. The compressor rotor 21 is connected to the turbine rotor 31 constituting the turbine 13. The compressor rotor 21 constitutes the rotor 30 together with the turbine rotor 31. The compressor rotor 21 rotates around the axis $O_1$.

The plurality of compressor rotor blade stages 23 are arranged on the outer peripheral surface 21a of the compressor rotor 21 at intervals in a direction along the axis $O_1$. The compressor rotor blade stages 23 include a plurality of compressor rotor blades 27 arranged at intervals in a circumferential direction of the outer peripheral surface 21a of the compressor rotor 21. The plurality of compressor rotor blades 27 rotate together with the compressor rotor 21.

The compressor casing 24 accommodates the compressor rotor 21 and the plurality of compressor rotor blade stages 23 with a gap interposed between the compressor casing 24 and tip end portions of the plurality of compressor rotor blades 27.

The compressor casing 24 is a tubular member of which the central axis is the axis $O_1$. The compressor casing 24 includes an inner peripheral surface 24a.

The plurality of compressor stator blade stages 25 are arranged on the inner peripheral surface 24a of the compressor casing 24 at intervals in the direction along the axis $O_1$. The plurality of compressor stator blade stages 25 are arranged such that the compressor rotor blade stages 23 and the compressor stator blade stages 25 are alternately arranged as seen in the direction along the axis $O_1$.

The compressor stator blade stages 25 include a plurality of compressor stator blades 28 arranged at intervals in the circumferential direction of the inner peripheral surface 24a of the compressor casing 24.

The compressor 11 configured as described above generates compressed air by sucking in air for combustion. The compressed air generated by the compressor 11 flows into the combustor 12.

The combustor 12 is provided between the compressor 11 and the turbine 13. The combustor 12 injects fuel into the compressed air generated by the compressor 11 to generate combustion gas. The combustion gas generated by the combustor 12, of which the temperature is high, is introduced into the turbine 13 so that the turbine 13 is driven.

The turbine 13 includes the turbine rotor 31, a plurality of turbine rotor blade stages 33, a turbine casing 34, and a plurality of turbine stator blade stages 35.

The turbine rotor 31 is a rotating body having a cylindrical shape. The turbine rotor 31 includes an outer peripheral surface 31a. The turbine rotor 31 rotates around the axis $O_1$.

The plurality of turbine rotor blade stages 33 are arranged on the outer peripheral surface 31a of the turbine rotor 31 at intervals in the direction along the axis $O_1$. The turbine rotor blade stages 33 include a plurality of turbine rotor blades 37 arranged at intervals in the circumferential direction of the outer peripheral surface 21a of the turbine rotor 31. The plurality of turbine rotor blades 37 rotate together with the turbine rotor 31.

The turbine casing 34 accommodates the turbine rotor 31 and the plurality of turbine rotor blade stages 33 with a gap interposed between the turbine casing 34 and tip end portions of the plurality of turbine rotor blades 37.

The turbine casing 34 is a tubular member of which the central axis is the axis $O_1$. The turbine casing 34 includes an inner peripheral surface 34a.

The turbine casing 34 includes a ring segment 41 that faces the tip end portions of the plurality of turbine rotor blades 37 with a gap interposed therebetween.

The plurality of turbine stator blade stages 35 are arranged on the inner peripheral surface 34a of the turbine casing 34 at intervals in the direction along the axis $O_1$. The plurality of turbine stator blade stages 35 are arranged such that the turbine rotor blade stages 33 and the turbine stator blade stages 35 are alternately arranged as seen in the direction along the axis $O_1$.

The turbine stator blade stages 35 include a plurality of turbine stator blades 38 arranged at intervals in the circumferential direction of the inner peripheral surface 34a of the turbine casing 34.

A configuration of each turbine rotor blade 37 in the first embodiment will be described with reference to FIGS. 2 to 4.

Figure 2:
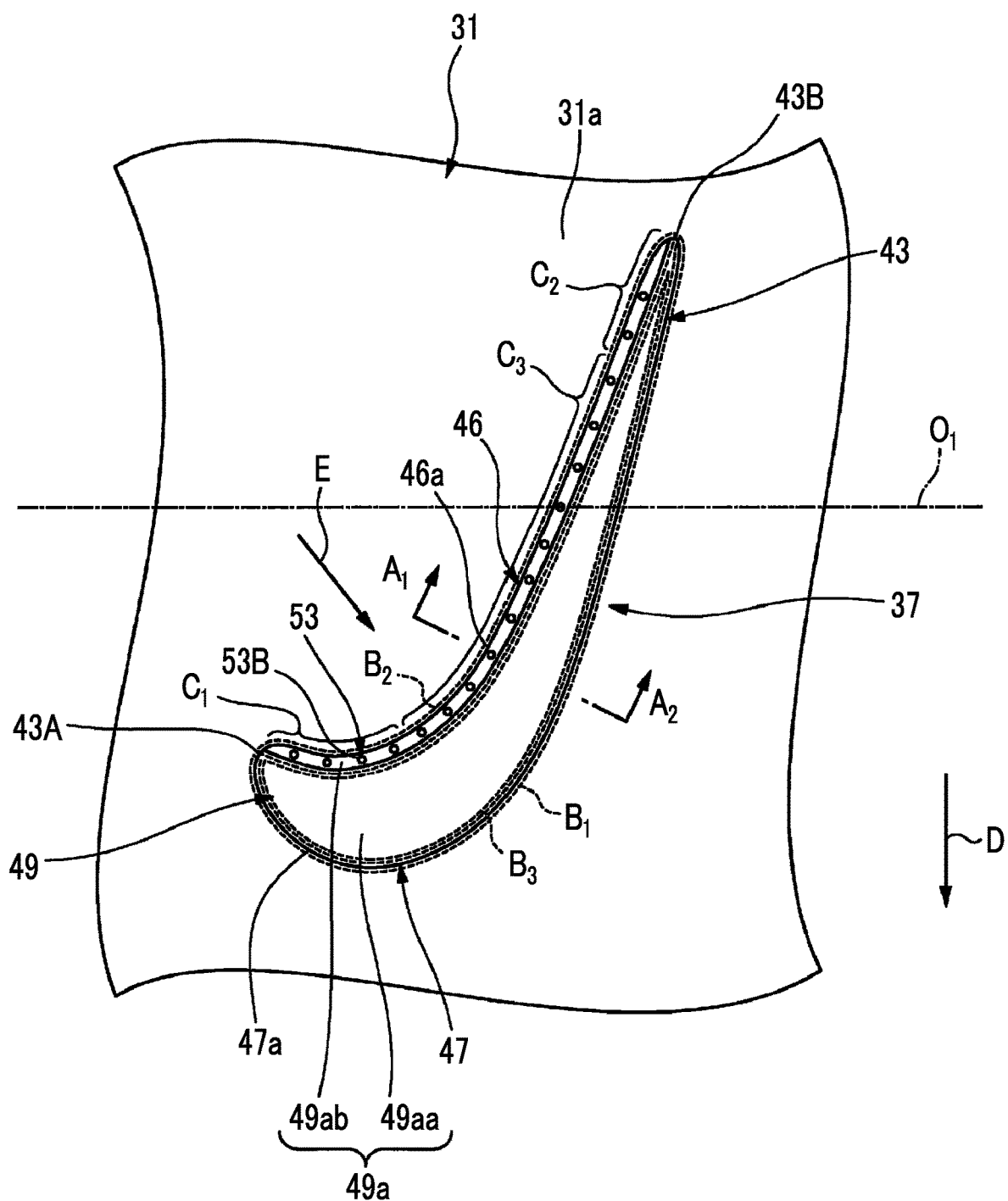
FIG. 2 is a schematic view of a turbine rotor blade shown in FIG. 1 as seen in plan view from an outer side in a radial direction of a turbine rotor.

In FIG. 2, $B_1$ denotes a suction surface side region (hereinafter, will be referred to as "suction surface side region $B_1$") that is disposed on a suction surface side blade wall 47 side and extends from a leading edge 43A toward a trailing edge 43B, $B_2$ denotes a pressure surface side region (hereinafter, will be referred to as "pressure surface side region $B_2$") that is disposed on a pressure surface side blade wall 46 side and extends from the leading edge 43A toward the trailing edge 43B, and $B_3$ denotes a central region (hereinafter, will be referred to as "central region $B_3$") that is disposed between the suction surface side region $B_1$ and the pressure surface side region $B_2$ and extends from the leading edge 43A toward the trailing edge 43B.

In addition, in FIG. 2, $C_1$ denotes a region (hereinafter, will be referred to as "leading edge side region $C_1$") on a second outer surface 49ab that is disposed on the leading edge 43A side, $C_2$ denotes a region (hereinafter, will be referred to as "trailing edge side region $C_2$") on the second outer surface 49ab that is disposed on the trailing edge 43B side, and C₃ denotes a region (hereinafter, will be referred to as "intermediate region $C_3$") on the second outer surface 49ab that is disposed between the leading edge side region $C_1$ and the trailing edge side region $C_2$.

Furthermore, in FIG. 2, D denotes a rotation direction (hereinafter, will be referred to as "D direction") of the turbine rotor 31 and E denotes a direction (hereinafter, will be referred to as "E direction") in which combustion gas flowing between the ring segment 41 and the turbine rotor blade 37 flows. In FIG. 2, the same components as those in a structure shown in FIG. 1 will be given the same reference numerals.

Figure 3:
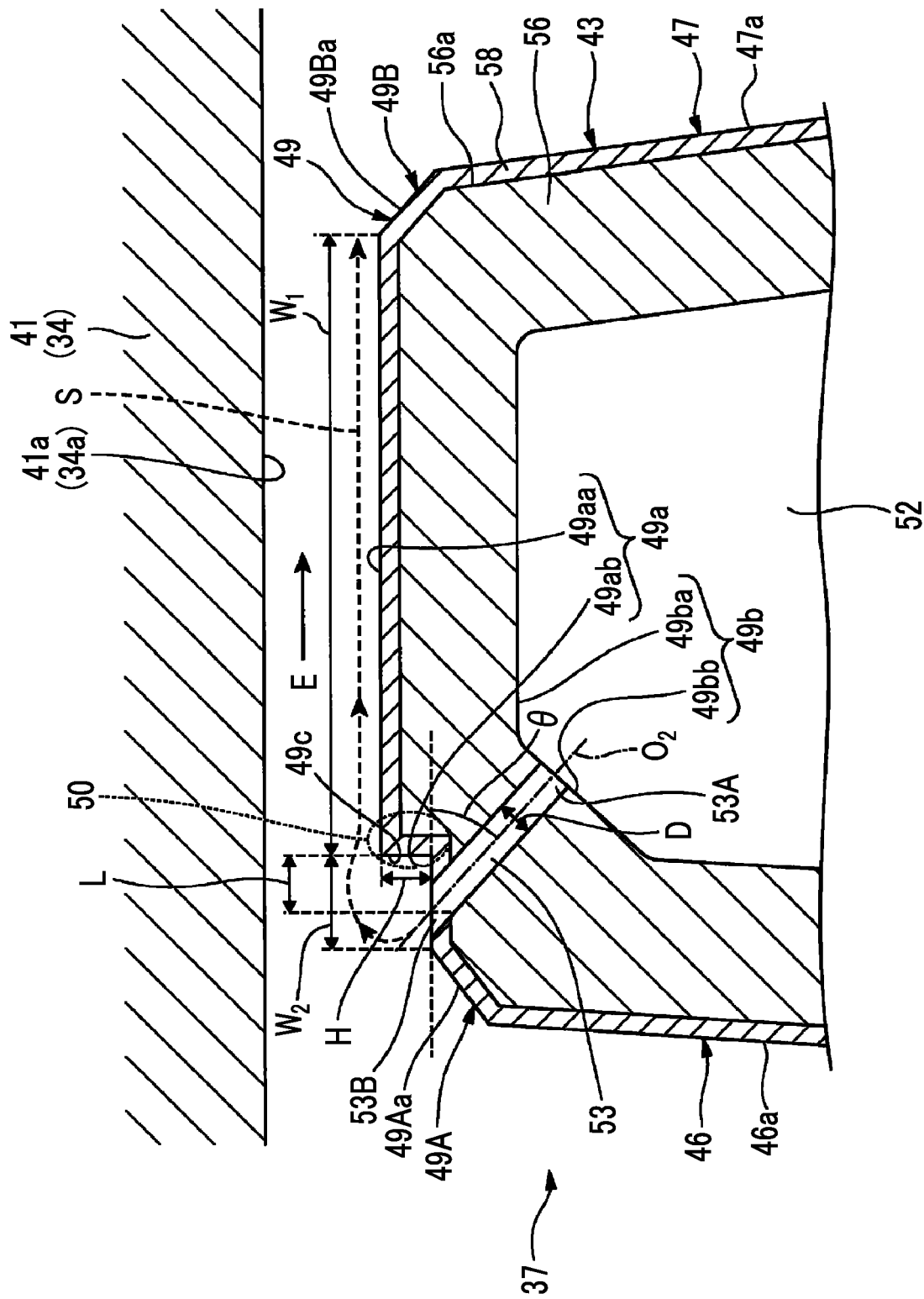
FIG. 3 is a sectional view of the turbine rotor blade shown in FIG. 2 taken along line $A_1$-$A_2$.
Figure 4:
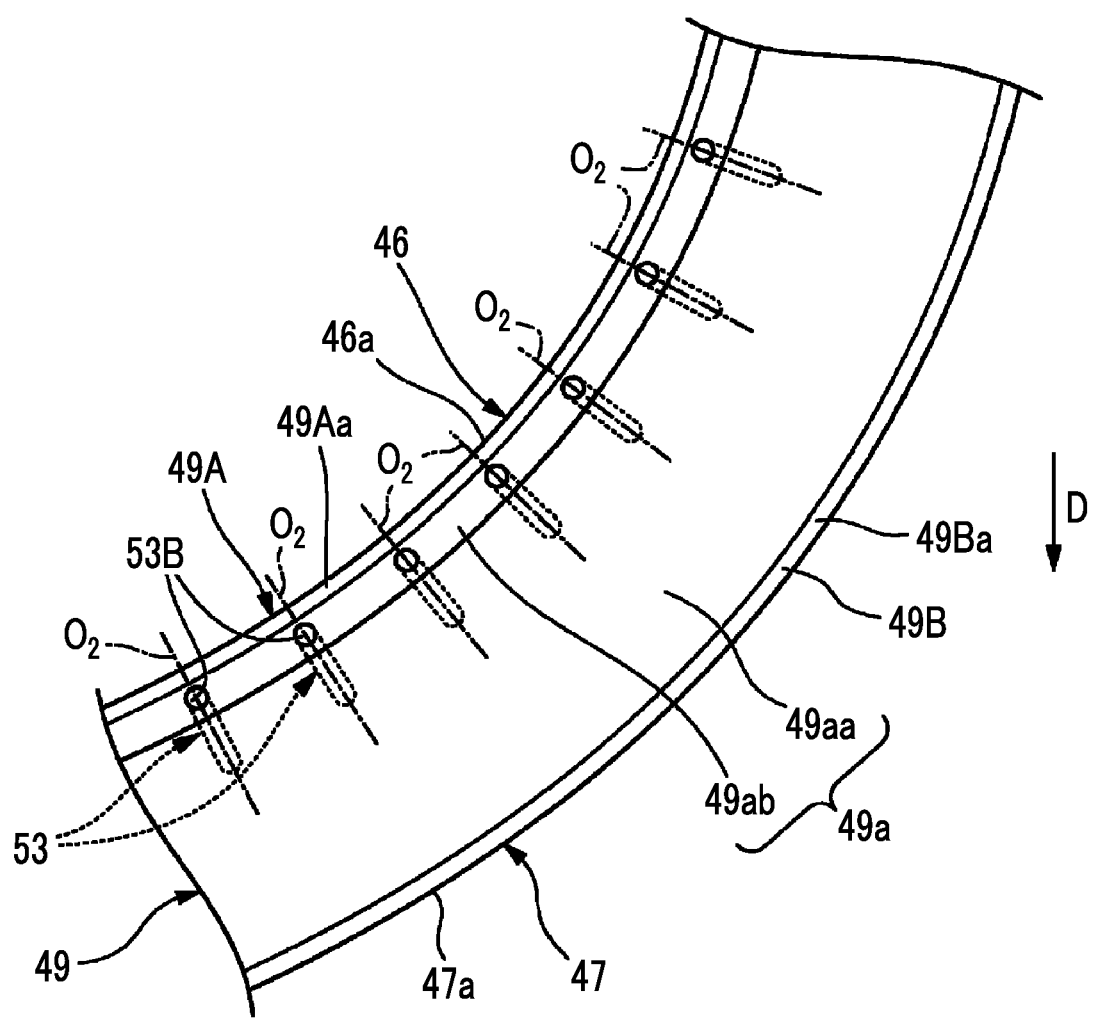
FIG. 4 is an enlarged plan view of a portion of the turbine rotor blade shown in FIG. 2 that corresponds to an intermediate region.

In FIG. 3, $O_2$ denotes the axis (hereinafter, will be referred to as "axis $O_2$") of a cooling hole 53, D denotes the diameter (hereinafter, will be referred to as "diameter D") of a section obtained when the cooling hole 53 is cut in a plane orthogonal to a direction along the axis $O_2$, θ denotes an angle (hereinafter, will be referred to as "angle θ") formed by the second outer surface 49ab of a top plate 49 and the axis $O_2$, and L denotes a distance (hereinafter, will be referred to as "distance L") from a connection position between a side surface 49c and the second outer surface 49ab to the axis $O_2$ of the cooling hole 53 in a direction orthogonal to the side surface 49c.

In addition, in FIG. 3, H denotes the height (hereinafter, will be referred to as "height H") of a step with respect to the second outer surface 49ab, $W_1$ denotes the width (hereinafter, will be referred to as "width $W_1$") of a first outer surface 49aa in a direction orthogonal to a pressure surface 46a of the pressure surface side blade wall 46, and $W_2$ denotes the width (hereinafter, will be referred to as "width $W_2$") of the second outer surface 49ab in the direction orthogonal to the pressure surface 46a of the pressure surface side blade wall 46.

Furthermore, a dotted arrow S shown in FIG. 3 schematically shows the flow of a cooling medium discharged from a discharge port 53B of the cooling hole 53.

In addition, in FIG. 3, the same components as those in a structure shown in FIG. 2 will be given the same reference numerals. In FIG. 4, the same components as those in a structure shown in FIGS. 2 and 3 will be given the same reference numerals.

The turbine rotor blade 37 in the first embodiment includes a blade body 43 and the cooling hole 53.

The blade body 43 includes the leading edge 43A, the trailing edge 43B, the pressure surface side blade wall 46, the suction surface side blade wall 47, the top plate 49, and a cooling channel 52.

The pressure surface side blade wall 46 and the suction surface side blade wall 47 extend in a radial direction of the turbine rotor 31. Each of the pressure surface side blade wall 46 and the suction surface side blade wall 47 has a curved shape. The pressure surface side blade wall 46 and the suction surface side blade wall 47 are connected to each other at the leading edge 43A and the trailing edge 43B.

The pressure surface side blade wall 46 includes the pressure surface 46a, which is an outer peripheral surface of the pressure surface side blade wall 46. The suction surface side blade wall 47 includes a suction surface 47a, which is an outer peripheral surface of the suction surface side blade wall 47. When the gas turbine 10 shown in FIG. 1 is driven such that the turbine rotor 31 rotates in the D direction, the suction surface 47a receives a pressure lower than a pressure against the pressure surface 46a.

The top plate 49 is provided at a tip end portion out of end portions (specifically, base end portions and tip end portions) of the pressure surface side blade wall 46 and the suction surface side blade wall 47, the tip end portion being disposed on an outer side in the radial direction of the turbine rotor 31.

The top plate 49 is a plate-shaped member and includes an outer surface 49a, an inner surface 49b, the side surface 49c, and chamfered portions 49A and 49B.

The outer surface 49a of the top plate 49 includes the first outer surface 49aa and the second outer surface 49ab.

The first outer surface 49aa is provided at the suction surface side region $B_1$ and the central region $B_3$. Accordingly, the first outer surface 49aa extends in a direction from the leading edge 43A to the trailing edge 43B.

The first outer surface 49aa is a surface that faces the inner peripheral surface 34a of the turbine casing 34 (specifically, inner peripheral surface 41a of ring segment 41). The first outer surface 49aa is a surface of which the shape matches the inner peripheral surface 34a of the turbine casing 34 or is flat.

The second outer surface 49ab is provided at the pressure surface side region $B_2$ and constitutes the rest of the outer surface 49a excluding the first outer surface 49aa. Accordingly, the second outer surface 49ab extends in the direction from the leading edge 43A to the trailing edge 43B.

The width $W_2$ of the second outer surface 49ab in the direction orthogonal to the pressure surface 46a is smaller than the width $W_1$ of the first outer surface 49aa.

The second outer surface 49ab is recessed from the first outer surface 49aa in a direction away from the inner peripheral surface 34a of the turbine casing 34 so that the step 50 is formed between the second outer surface 49ab and the first outer surface 49aa. The second outer surface 49ab is a surface in which the discharge port 53B of the cooling hole 53 is formed.

A cooling medium discharged to an upstream side of combustion gas from the discharge port 53B of the cooling hole 53 collides with a corner portion of the step 50 (hereinafter, will be simply referred to as "corner portion of step 50") that is positioned on the inner peripheral surface 34a side of the turbine casing 34. The cooling medium colliding with the corner portion of the step 50 flows to the suction surface 47a side along the first outer surface 49aa such that the first outer surface 49aa is subject to film cooling.

The inner surface 49b of the top plate 49 includes a first inner surface 49ba and a second inner surface 49bb.

The first inner surface 49ba is a surface that is disposed to be opposite to the first outer surface 49aa. The first inner surface 49ba is exposed at the cooling channel 52 formed in the blade body 43.

The second inner surface 49bb is a surface that is disposed to be opposite to the second outer surface 49ab and is connected to the first inner surface 49ba. The second inner surface 49bb is exposed at the cooling channel 52 formed in the blade body 43.

The second inner surface 49bb is inclined in a direction away from the inner peripheral surface 34a of the turbine casing 34 toward the second outer surface 49ab from the first outer surface 49aa. The second inner surface 49bb is inclined with respect to the first inner surface 49ba.

The second inner surface 49bb is a surface in which an introduction inlet 53A of the cooling hole 53 is formed.

The side surface 49c is disposed between the first outer surface 49aa and the second outer surface 49ab. The side surface 49c connects the first outer surface 49aa and the second outer surface 49ab to each other. The side surface 49c has a shape matching the pressure surface 46a.

The chamfered portion 49A is formed by chamfering a corner portion of the top plate 49 that is positioned on the pressure surface side blade wall 46 side. The chamfered portion 49A is formed over an area from the leading edge 43A of the blade body 43 to the trailing edge 43B.

The chamfered portion 49A is formed between the second outer surface 49*ab* and the pressure surface 46*a*. The chamfered portion 49A includes a first inclined surface 49Aa.

The first inclined surface 49Aa is disposed between the second outer surface 49*ab* and the pressure surface 46*a*. The first inclined surface 49Aa is connected to the second outer surface 49*ab* and the pressure surface 46*a*. The first inclined surface 49Aa is a surface inclined with respect to the second outer surface 49*ab* and the pressure surface 46*a*.

As described above, in a case where the first inclined surface 49Aa that connects the second outer surface 49*ab* and the pressure surface 46*a* to each other and is inclined with respect to the second outer surface 49*ab* and the pressure surface 46*a* is provided, it is possible to suppress an increase in temperature of the top plate 49 (portion of blade body 43) constituting the first inclined surface 49Aa to a high temperature.

The chamfered portion 49B is formed by chamfering a corner portion of the top plate 49 that is positioned on the suction surface side blade wall 47 side. The chamfered portion 49B is formed over an area from the leading edge 43A of the blade body 43 to the trailing edge 43B.

The chamfered portion 49B is formed between the first outer surface 49*aa* and the suction surface 47*a*. The chamfered portion 49B includes a second inclined surface 49Ba.

The second inclined surface 49Ba is disposed between the first outer surface 49*aa* and the suction surface 47*a*. The second inclined surface 49Ba is connected to the first outer surface 49*aa* and the suction surface 47*a*. The second inclined surface 49Ba is a surface inclined with respect to the first outer surface 49*aa* and the suction surface 47*a*.

As described above, in a case where the second inclined surface 49Ba that connects the first outer surface 49*aa* and the suction surface 47*a* to each other and is inclined with respect to the first outer surface 49*aa* and the suction surface 47*a* is provided, it is possible to suppress an increase in temperature of the top plate 49 (portion of blade body 43) constituting the second inclined surface 49Ba to a high temperature.

The above-described first and second inclined surfaces 49Aa and 49Ba are disposed to surround the outer surface 49*a* of the top plate 49.

Note that, in FIG. 3, flat surfaces have been described as an example of the first and second inclined surfaces 49Aa and 49Ba. However, the first and second inclined surfaces 49Aa and 49Ba may be projecting curved surfaces, for example.

The blade body 43 including the pressure surface side blade wall 46, the suction surface side blade wall 47, and the top plate 49 as described above is configured to include a metal substrate 56 and a thermal insulation coating layer 58 (thermal barrier coating layer (TBC layer)).

The metal substrate 56 corresponds to the shape of the blade body 43. That is, the metal substrate 56 includes an outer surface 56*a* that constitutes the outer surface 49*a*, the side surface 49*c*, the first inclined surface 49Aa, the second inclined surface 49Ba, the pressure surface 46*a*, and the suction surface 47*a*. Accordingly, the metal substrate 56 is formed with a step corresponding to the step 50.

In addition, in the metal substrate 56, the cooling channel 52 is formed.

The metal substrate 56 configured as described above is formed of metalic material excellent in heat resistance.

The thermal insulation coating layer 58 is provided to cover the outer surface 56*a* of the metal substrate 56 that constitutes the blade body 43. Accordingly, the pressure surface 46*a*, the suction surface 47*a*, the first outer surface 49*aa*, the second outer surface 49*ab*, the first inclined surface 49Aa, the second inclined surface 49Ba, and the side surface 49*c* are formed by an outer surface 58*a* of the thermal insulation coating layer 58.

Since a portion corresponding to the first outer surface 49*aa* is formed by the thermal insulation coating layer 58 as described above, it is possible to protect the metal substrate 56 from high-temperature combustion gas.

As the thermal insulation coating layer 58, for example, a two-layer laminate obtained by laminating a thermal insulation layer and a bonding layer can be used. The bonding layer is a layer for improving adhesion between the thermal insulation layer and the metal substrate 56 by alleviating a thermal expansion difference between the thermal insulation layer and the metal substrate 56.

As the thermal insulation layer, for example, a ceramic thermal insulation layer having a low thermal conductivity (for example, yttria-stabilized zirconia (YSZ) layer) can be used. In addition, as the bonding layer, for example, a bonding layer called MCrAlY can be used.

The cooling channel 52 is provided inward of the pressure surface side blade wall 46, the suction surface side blade wall 47, and the top plate 49 (inside blade body 43). In the cooling channel 52, a cooling medium for cooling the blade body 43 disposed in a high-temperature environment flows.

The cooling hole 53 is formed in the top plate 49 and includes the introduction inlet 53A and the discharge port 53B.

The introduction inlet 53A is provided at a portion of the top plate 49 that constitutes the second inner surface 49*bb*. The introduction inlet 53A is exposed through the second inner surface 49*bb* and communicates with the cooling channel 52. The introduction inlet 53A faces the first outer surface 49*aa* in the radial direction of the turbine rotor 31. Through the introduction inlet 53A, a cooling medium flowing through the cooling channel 52 is guided into the cooling hole 53.

The discharge port 53B is provided in a portion of the top plate 49 that constitutes the second outer surface 49*ab*. The discharge port 53B is disposed closer to the pressure surface 46*a* than a position where the introduction inlet 53A is formed. The discharge port 53B is exposed through the second outer surface 49*ab*. The discharge port 53B communicates with the introduction inlet 53A. Through the discharge port 53B, a cooling medium passing through the cooling hole 53 is discharged to the outside of the second outer surface 49*ab*.

The cooling hole 53 is a hole that is inclined toward the pressure surface 46*a* side at a certain angle. The axis $O_2$ of the cooling hole 53 is inclined with respect to the second outer surface 49*ab* at the angle θ. As seen in plan view, the axis $O_2$ of the cooling hole 53 can be disposed in a direction orthogonal to the pressure surface 46*a*, for example.

Through the discharge port 53B, a cooling medium is discharged to an upstream side of combustion gas flowing between the second outer surface 49*ab* and the inner peripheral surface 34*a* of the turbine casing 34.

It is preferable that the angle θ formed by the axis $O_2$ of the cooling hole 53 and the second outer surface 49*ab* is set within a range of 30° to 45°.

For example, in a case where the angle θ is smaller than 30°, there is a possibility that it becomes difficult to process the cooling hole 53.

Meanwhile, in a case where the angle θ is greater than 45°, a cooling medium discharged from the cooling hole 53 flows at a position separated from the first outer surface 49aa and thus there is a possibility that it becomes difficult to achieve high film cooling effectiveness.

Therefore, in a case where the angle θ formed by the axis $O_2$ of the cooling hole 53 and the second outer surface 49ab is set to be equal to or greater than 30° and equal to or smaller than 45°, it becomes easy to process the cooling hole 53 and it becomes possible to perform film cooling on the first outer surface 49aa of the top plate 49.

A section of the cooling hole 53 obtained when the cooling hole 53 is cut in a plane (virtual plane) orthogonal to the direction along the axis $O_2$ is circular.

The height H of the step 50 as described above can be determined based on the diameter D of the cooling hole 53 at the section described above.

Figure 5:
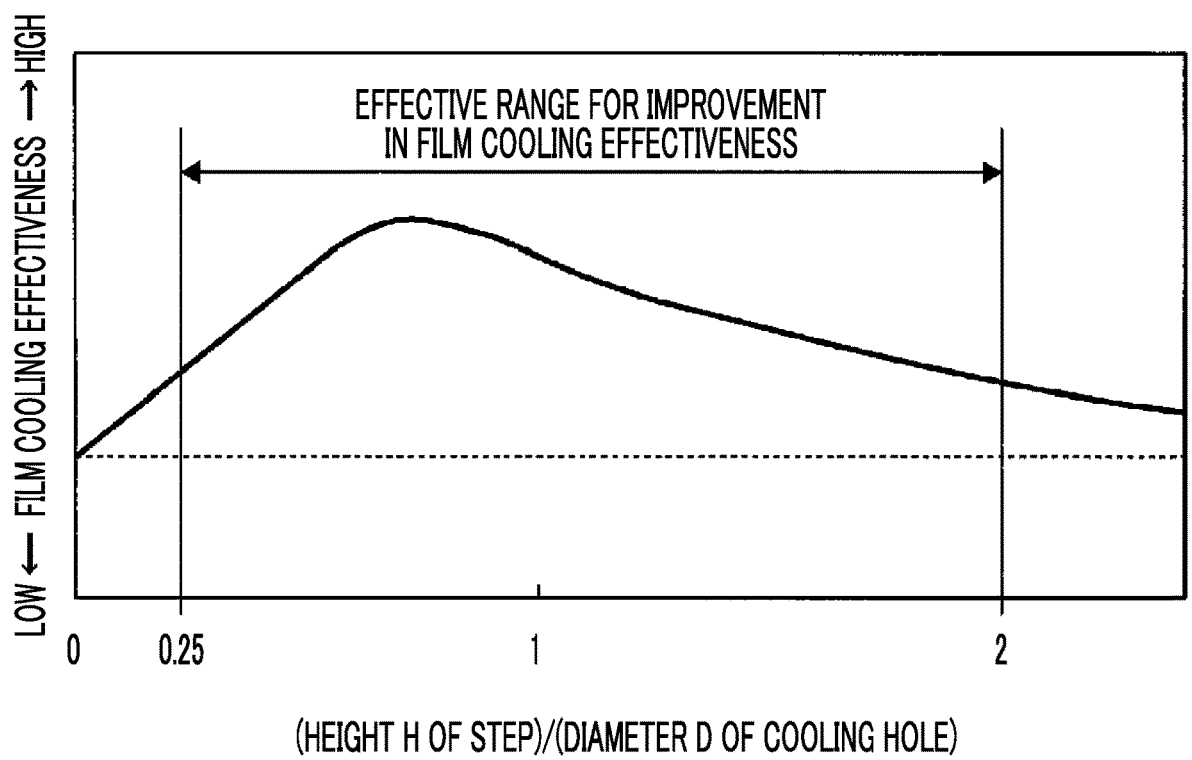
FIG. 5 is a graph showing a relationship between (the height H of a step)/(the diameter D of a cooling hole) and film cooling effectiveness.

Specifically, as shown in FIG. 5, it is preferable that the height H of the step 50 is set within a range of 0.25 D to 2.00 D.

For example, in a case where the height H of the step 50 is smaller than 0.25 D, since the step 50 is too small, there is a possibility that it becomes difficult to cause a cooling medium discharged from the cooling hole 53 to collide with a corner portion of the step 50. Accordingly, there is a possibility that it becomes difficult to cause a cooling medium to flow along the first outer surface 49aa.

Meanwhile, in a case where the height H of the step 50 is greater than 2.00 D, since the step 50 is too large, there is a possibility that the step 50 (side surface 49c) becomes an obstacle and it becomes difficult to cause a cooling medium discharged from the cooling hole 53 to flow along the first outer surface 49aa.

Therefore, in a case where the height H of the step is set in a range of 0.25 D to 2.00 D, a cooling medium discharged from the cooling hole 53 flows along the first outer surface 49aa and thus it is possible to reduce the amount of cooling medium used to cool the blade body 43.

In addition, it is preferable that the distance L from the connection position between the side surface 49c and the second outer surface 49ab to the axis $O_2$ of the cooling hole 53 in the direction orthogonal to the side surface 49c is set within a range of 0 to D, for example.

For example, in a case where the distance L is smaller than 0, a major portion of the discharge port 53B is formed in the side surface 49c and thus the height of the step with respect to the cooling hole 53 becomes smaller than the height H.

Therefore, there is a possibility that it becomes difficult to cause a cooling medium discharged from the cooling hole 53 to collide with the corner portion of the step 50. Accordingly, there is a possibility that it becomes difficult to cause a cooling medium to flow along the first outer surface 49aa.

Meanwhile, in a case where the distance L is greater than the diameter D of the cooling hole 53, a cooling medium is discharged to a position excessively separated from the step 50 and thus there is a possibility that it becomes difficult to cause the cooling medium to collide with the corner portion of the step 50. Accordingly, there is a possibility that it becomes difficult to cause a cooling medium to flow along the first outer surface 49aa.

Therefore, in a case where the distance L is set to be equal to or greater than 0 and equal to or smaller than D, a cooling medium discharged from the cooling hole 53 flows along the first outer surface 49aa and thus it is possible to reduce the amount of cooling medium used to cool the blade body 43.

A plurality of the cooling holes 53 configured as described above are arranged at intervals in a direction from the leading edge 43A to the trailing edge 43B. The plurality of cooling holes 53 are formed in each of the leading edge side region $C_1$, the trailing edge side region $C_2$, and the intermediate region $C_3$.

In addition, the cooling holes 53 are formed at the same pitch in the leading edge side region $C_1$, the trailing edge side region $C_2$, and the intermediate region $C_3$.

According to the turbine rotor blade 37 in the first embodiment, the discharge port 53B is disposed in the second outer surface 49ab of the top plate 49 that is positioned closer to the pressure surface side blade wall 46 side than the step 50 and the cooling hole 53 through which a cooling medium is discharged to an upstream side of combustion gas flowing between the second outer surface 49ab and the inner peripheral surface 34a of the turbine casing 34 is provided and thus the cooling medium discharged to the upstream side of the combustion gas separated from the step 50 can be caused to flow along the first outer surface 49aa of the top plate 49.

Accordingly, it is possible to efficiently perform film cooling on the first outer surface 49aa positioned closer to the suction surface side blade wall 47 side than the step 50 by causing a cooling medium discharged from the discharge port 53B to collide with a corner portion of the step 50. Therefore, it is possible to reduce the amount of cooling medium used to cool the blade body 43.

In addition, since the cooling hole 53 that extends while being inclined with respect to the second outer surface 49ab and through which the cooling medium is discharged to the upstream side of combustion gas flowing between the second outer surface 49ab and the inner peripheral surface 34a of the turbine casing 34 is provided, a distance between a portion of the top plate 49 that constitutes the first outer surface 49aa and the cooling hole 53 can be made short in the radial direction of the turbine rotor 31. Accordingly, it is possible to efficiently cool the top plate 49 constituting the first outer surface 49aa through convection cooling.

In addition, in the case of the gas turbine 10 including the plurality of turbine rotor blades 37 as described above, it is possible to reduce the amount of cooling medium used to cool the plurality of turbine rotor blades 37.

Second Embodiment

A turbine rotor blade 65 according to a second embodiment of the present invention will be described with reference to FIGS. 6 and 7.

Figure 6:
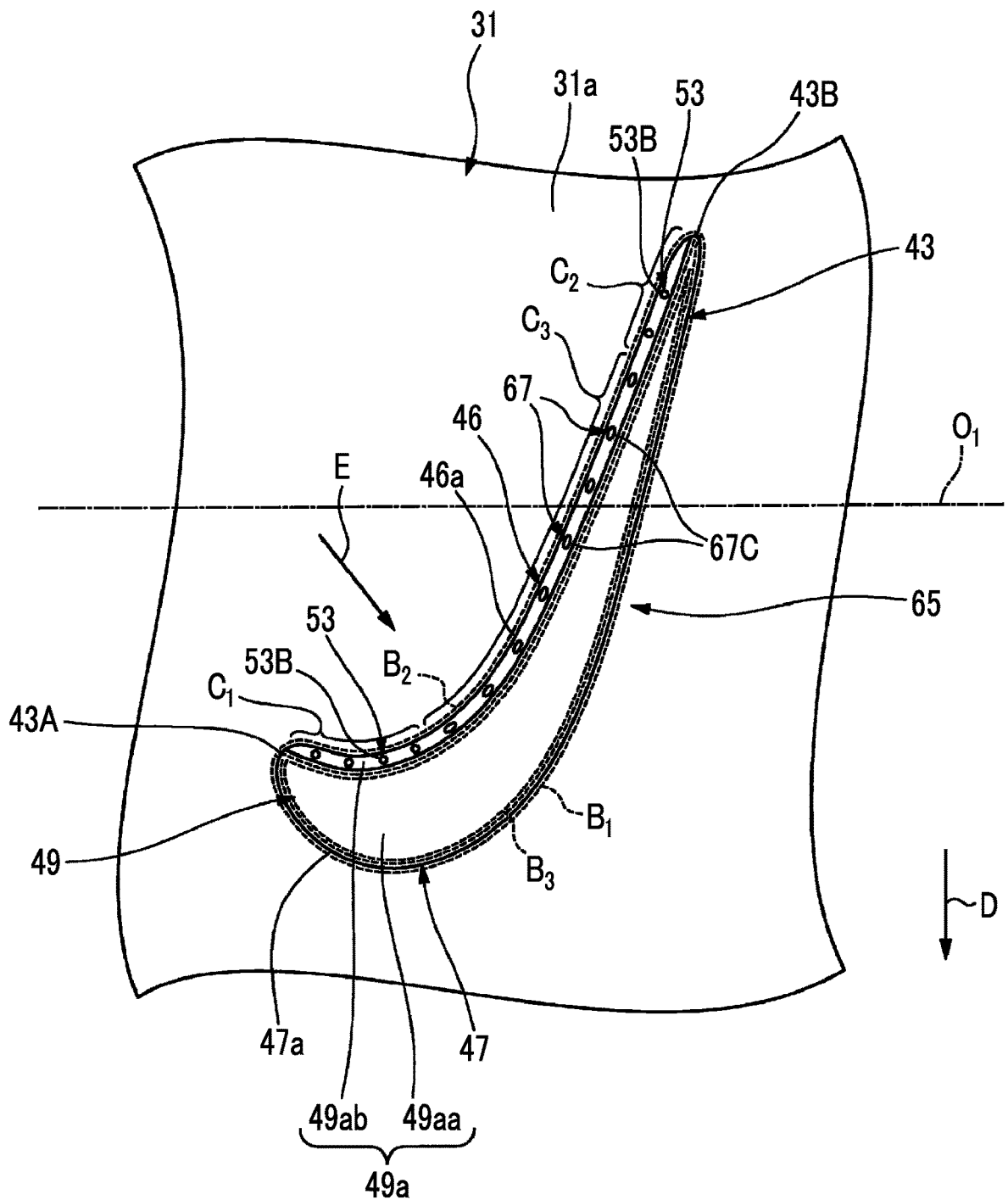
FIG. 6 is a schematic view of a turbine rotor blade according to a second embodiment of the present invention as seen in plan view from an outer side in a radial direction of a turbine rotor.
Figure 7:
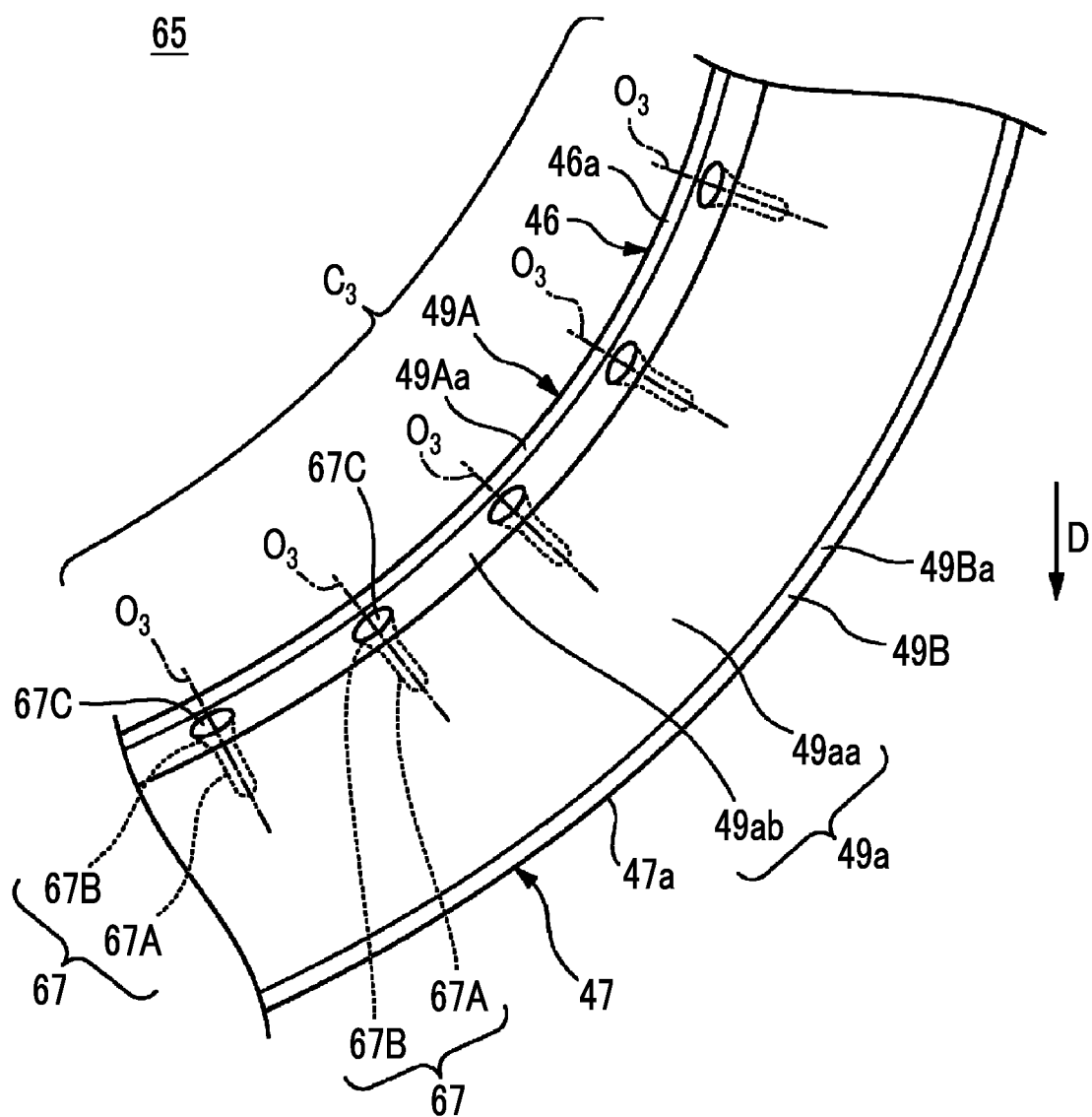
FIG. 7 is an enlarged plan view of a portion of the turbine rotor blade shown in FIG. 6 that corresponds to an intermediate region.

In FIG. 6, the same components as those in a structure shown in FIG. 2 will be given the same reference numerals. In FIG. 7, $O_3$ denotes the axis (hereinafter, will be referred to as "axis $O_3$") of each cooling hole 67. In FIG. 7, the same components as those in a structure shown in FIGS. 4 and 6 will be given the same reference numerals.

The turbine rotor blade 65 is configured in the same manner as the turbine rotor blade 37 described in the first embodiment except that a plurality of the cooling holes 53 are formed in the leading edge side region $C_1$ and the trailing edge side region $C_2$ as first cooling holes and a plurality of the cooling holes 67 are formed in the intermediate region $C_3$ as second cooling holes.

The cooling hole 67 penetrates the top plate 49 and extends while being inclined with respect to the second outer surface 49ab such that a cooling medium is discharged to an upstream side of combustion gas. An angle formed by the axis $O_3$ of the cooling hole 67 and the second outer surface 49ab is equal to the angle θ described in the first embodiment.

The cooling hole 67 includes a first portion 67A and a second portion 67B.

The first portion 67A is formed on a cooling channel (cooling channel 52 shown in FIG. 3) side and communicates with the cooling channel. The first portion 67A has the same configuration as the cooling hole 53 described above. That is, a section of the first portion 67A obtained when the first portion 67A is cut in a plane orthogonal to the direction along the axis $O_3$ of the cooling hole 67 is circular.

The axis $O_3$ of the cooling hole 67 can be disposed in a direction orthogonal to the pressure surface 46a as seen in plan view, for example.

The second portion 67B is formed outside the first portion 67A. One end portion of the second portion 67B is connected to the first portion 67A. A discharge port 67C is disposed at the other end portion of the second portion 67B.

The second portion 67B is configured such that the width of the second portion 67B in a direction along the pressure surface 46a of the pressure surface side blade wall 46 increases toward the discharge port 67C from the first portion 67A.

According to the turbine rotor blade 65 in the second embodiment, a section of each of the plurality of cooling holes 67 formed in the intermediate region $C_3$ that is obtained when the cooling hole 67 is cut in a plane orthogonal to the axis $O_3$ is circular and each cooling hole 67 includes the first portion 67A of which the diameter in a direction along the axis $O_3$ is constant and the second portion 67B of which the width in a direction along the pressure surface 46a of the pressure surface side blade wall 46 increases toward the discharge port 67C from the first portion 67A. Therefore, a cooling medium can be discharged to a wide range from the discharge ports 67C since the width of each of the discharge ports 67C of the plurality of cooling holes 67 in the direction along the pressure surface 46a of the pressure surface side blade wall 46 is large.

Accordingly, the arrangement pitch of the cooling holes 67 can be made larger than the arrangement pitch of the cooling holes 53 described in the first embodiment so that the number of cooling holes 67 to be disposed in the intermediate region $C_3$ is reduced.

Third Embodiment

Figure 8:
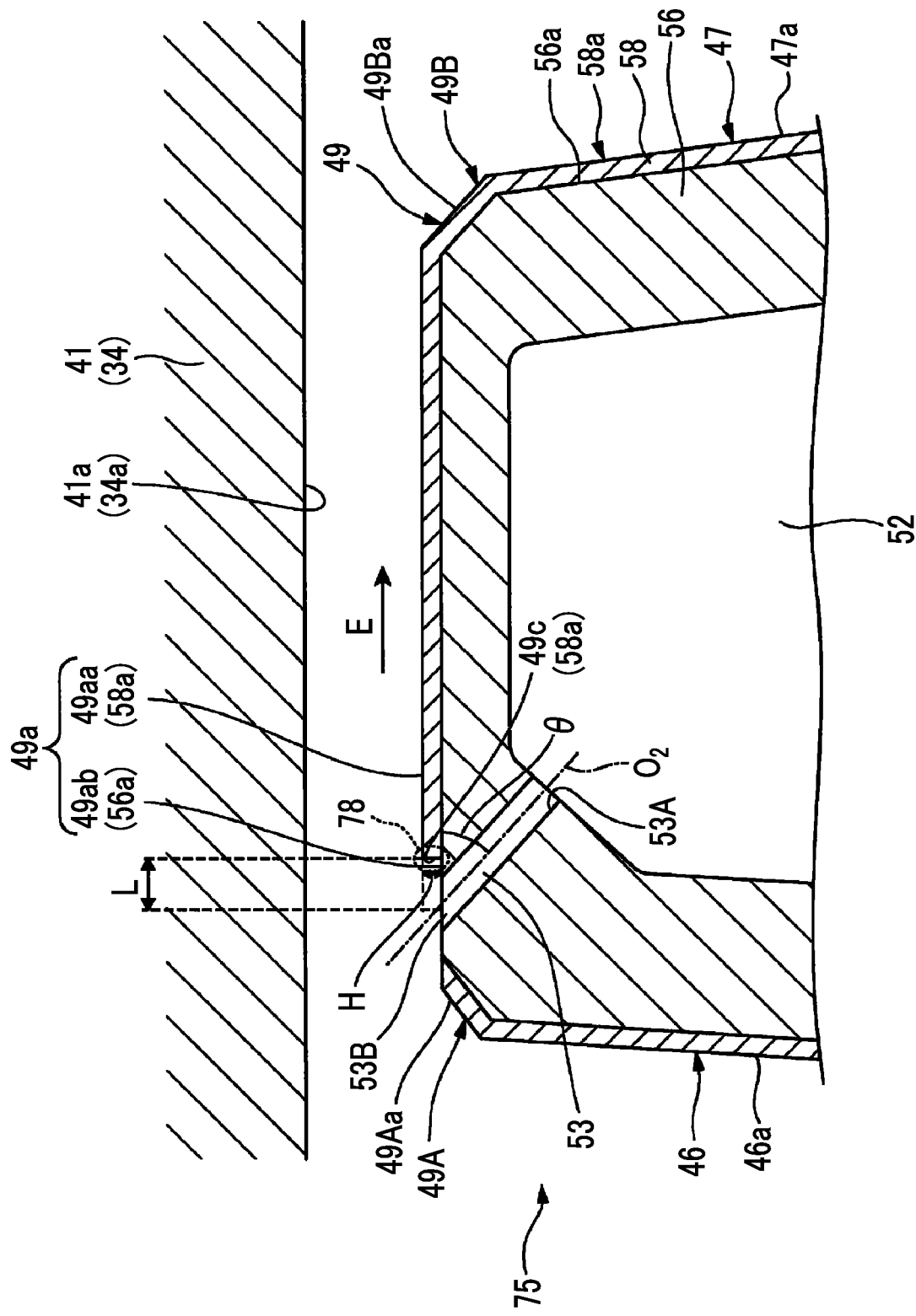
FIG. 8 is a sectional view of a principal portion of a turbine rotor blade according to a third embodiment of the present invention and a turbine casing positioned in the vicinity of the turbine rotor blade.

As shown in FIG. 8, a turbine rotor blade 75 in a third embodiment of the present invention has the same configuration as the turbine rotor blade 75 in the first embodiment except that the turbine rotor blade 75 includes a blade body 76 instead of the blade body 43 described in the first embodiment.

The blade body 76 has the same configuration as the blade body 43 described in the first embodiment except that no step is formed at a portion of the metal substrate constituting the top plate 49 that faces the inner peripheral surface 34a of the turbine casing 34, the second outer surface 49ab is formed by the outer surface 56a of the metal substrate 56, and the first outer surface 49aa and the side surface 49c are formed by the outer surface 58a of the thermal insulation coating layer 58 such that a step 78 is formed between the second outer surface 49ab and the first outer surface 49aa.

In the third embodiment, the thermal insulation coating layer 58 is formed to cover a surface other than the second outer surface 49ab.

According to the turbine rotor blade 75 in an embodiment of the third embodiment, the first outer surface 49aa and the side surface 49c are formed by the outer surface 58a of the thermal insulation coating layer and the second outer surface 49ab is formed by the outer surface 56a of the metal substrate 56 and thus it is possible to form the step 78 by using the thickness of the thermal insulation coating layer 58 without forming a step at the metal substrate 56.

Accordingly, it is possible to easily manufacture the metal substrate 56 and thus it is possible to reduce the cost of manufacturing the blade body 76.

Although preferred embodiments of the present invention have been described above in detail, the present invention is not limited to these specific embodiments and various modifications and changes can be made without departing from the gist of the present invention described in the claims.

For example, the cooling hole 67 described in the second embodiment may be applied to the turbine rotor blade 75 in the third embodiment.

INDUSTRIAL APPLICABILITY

The present invention can be applied to a turbine rotor blade and a gas turbine.

REFERENCE SIGNS LIST

10: gas turbine
11: compressor
12: combustor
13: turbine
15: generator
21: compressor rotor
21a, 31a: outer peripheral surface
23: compressor rotor blade stage
24: compressor casing
24a, 34a, 41a: inner peripheral surface
25: compressor stator blade stage
27: compressor rotor blade
28: compressor stator blade
30: rotor
31: turbine rotor
33: turbine rotor blade stage
34: turbine casing
35: turbine stator blade stage
37, 65, 75: turbine rotor blade
38: turbine stator blade
41: ring segment
43, 76: blade body
43A: leading edge
43B: trailing edge
46: pressure surface side blade wall
46a: pressure surface
47: suction surface side blade wall
47a: suction surface
49: top plate
49a, 56a, 58a: outer surface
49aa: first outer surface
49ab: second outer surface
49A, 49B: chamfered portion
49Aa: first inclined surface
49b: inner surface
49ba: first inner surface
49bb: second inner surface
49Ba: second inclined surface
49c: side surface
50, 78: step 52: cooling channel
53, 67: cooling hole
53A: introduction inlet
53B, 67C: discharge port
56: metal substrate
58: thermal insulation coating layer
67A: first portion
67B: second portion
$B_1$: suction surface side region
$B_2$: pressure surface side region
$B_3$: central region
$C_1$: leading edge side region
$C_2$: trailing edge side region
$C_3$: intermediate region
D, E: direction
H: height
$O_1$~$O_3$: axis
$W_1$, $W_2$: width
θ: angle

The invention claimed is:

1. A turbine rotor blade comprising:
a blade body that includes a pressure surface side blade wall and a suction surface side blade wall that extend in a radial direction of a turbine rotor and are connected to each other at a leading edge and a trailing edge and a top plate that is provided at a tip end portion out of end portions of the pressure surface side blade wall and the suction surface side blade wall and includes an outer surface facing an inner peripheral surface of a casing, the tip end portion being disposed on an outer side in the radial direction of the turbine rotor; and
a cooling hole that penetrates the top plate and includes a discharge port through which a cooling medium is discharged to an outside of the top plate,
wherein the outer surface of the top plate includes a first outer surface that is provided at a suction surface side region and a central region and a second outer surface that is provided at a pressure surface side region and constitutes the rest of the outer surface excluding the first outer surface, the suction surface side region being disposed on the suction surface side blade wall side and extending from the leading edge to the trailing edge, the central region being disposed between the pressure surface side region disposed on the pressure surface side blade wall side and extending from the leading edge to the trailing edge and the suction surface side region and extending from the leading edge to the trailing edge, and the pressure surface side region being disposed on the pressure surface side blade wall side and extending from the leading edge to the trailing edge,
wherein the second outer surface is more distant from the inner peripheral surface of the casing than the first outer surface such that a step is formed between the second outer surface and the first outer surface,
wherein a portion where the step is formed is provided with a side surface that connects the first outer surface and the second outer surface to each other and extends along a pressure surface of the pressure surface side blade wall,
wherein the cooling hole extends while being inclined with respect to the second outer surface such that the cooling medium is discharged to an upstream side of combustion gas flowing between the second outer surface and the inner peripheral surface of the casing, and
wherein at least a portion of the discharge port is disposed in the second outer surface.

2. The turbine rotor blade according to claim 1,
wherein the cooling hole includes a portion of which a section obtained when the portion is cut in a plane orthogonal to an axial direction of the cooling hole is circular, and
wherein a height of the step in the radial direction of the turbine rotor falls into a range of 0.25D to 2.00D, where D is a diameter of the cooling hole at the section.

3. The turbine rotor blade according to claim 1,
wherein the cooling hole includes a portion of which a section obtained when the portion is cut in a plane orthogonal to an axial direction of the cooling hole is circular, and
wherein a distance from a connection position between the side surface and the second outer surface to an axis of the cooling hole in a direction orthogonal to the side surface is equal to or greater than 0 and equal to or smaller than D, where D is a diameter of the cooling hole at the section.

4. The turbine rotor blade according to claim 1,
wherein an angle formed by an axis of the cooling hole and the second outer surface is equal to or greater than 30° and equal to or smaller than 45°.

5. The turbine rotor blade according to claim 1, further comprising:
a first inclined surface that is provided between the second outer surface and the pressure surface of the pressure surface side blade wall, connects the second outer surface and the pressure surface to each other, and is inclined with respect to the second outer surface and the pressure surface; and
a second inclined surface that is provided between the first outer surface and a suction surface of the suction surface side blade wall, connects the first outer surface and the suction surface to each other, and is inclined with respect to the first outer surface and the suction surface.

6. The turbine rotor blade according to claim 3,
wherein the blade body includes a metal substrate that corresponds to a shape of the blade body and a thermal insulation coating layer that covers an outer surface of the metal substrate, and
wherein the first outer surface, the second outer surface, and the side surface are formed by an outer surface of the thermal insulation coating layer.

7. The turbine rotor blade according to claim 3,
wherein the blade body includes a metal substrate that corresponds to a shape of the blade body and a thermal insulation coating layer that covers an outer surface of the metal substrate except for the second outer surface, and
wherein the first outer surface and the side surface are formed by an outer surface of the thermal insulation coating layer, and
wherein the second outer surface is formed by the outer surface of the metal substrate.

8. The turbine rotor blade according to claim 1,
wherein a plurality of the cooling holes are formed at intervals from the leading edge to the trailing edge along the pressure surface of the pressure surface side blade wall.

9. The turbine rotor blade according to claim 8,
wherein a cooling channel through which the cooling medium flows is formed inside the blade body, wherein the plurality of cooling holes include a plurality of first cooling holes that are formed in a leading edge side region positioned on the leading edge side and a trailing edge side region positioned on the trailing edge side and a plurality of second cooling holes that are formed in an intermediate region disposed between the leading edge side region and the trailing edge side region, wherein a section of the first cooling hole which is cut in a plane orthogonal to an axial direction of the first cooling hole is circular, wherein the second cooling hole includes a first portion that is formed on the cooling channel side and a second portion that is formed outside the first portion in a state of being connected to the first portion and includes the discharge port, wherein a section of the first portion which is cut in a plane orthogonal to an axial direction of the second cooling hole is circular and a diameter of the first portion in the axial direction of the second cooling hole is constant, and wherein a width of the second portion in a direction along the pressure surface of the pressure surface side blade wall increases toward the discharge port from the first portion.

10. A gas turbine comprising:

a turbine that includes a turbine rotor in which a plurality of the turbine rotor blades according to claim 1 are disposed in a circumferential direction and an axial direction and the plurality of turbine rotor blades;

a compressor that generates compressed air by sucking in air for combustion;

a combustor that injects fuel into the compressed air to cause combustion and to generate combustion gas with which the turbine is driven; and a casing that includes a ring segment and accommodates the turbine rotor and the plurality of turbine rotor blades, the ring segment facing the first and second outer surfaces of the top plate in a state where a gap is interposed therebetween.

\* \* \* \* \*